E. R. IVES.
Automatic-Toys.
No. 149,481.
Patented April 7, 1874.
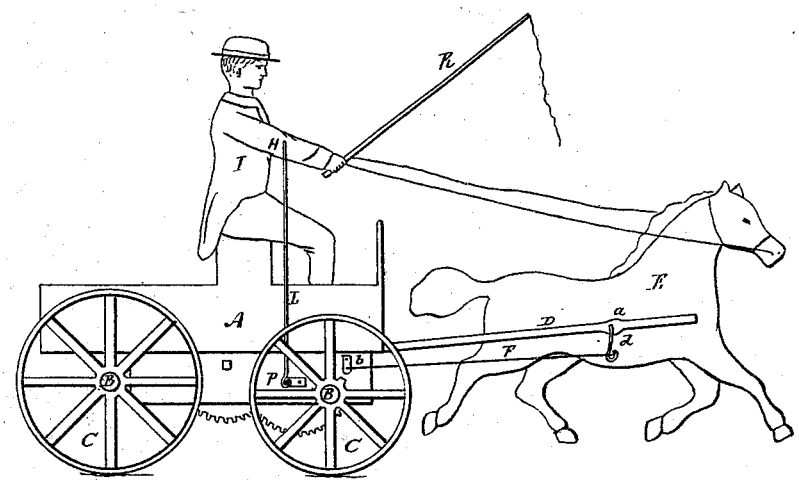
Witnesses.
Edward R. Ives.
Inventor
By Atty.

UNITED STATES PATENT OFFICE.

EDWARD R. IVES, OF BRIDGEPORT, CONNECTICUT, ASSIGNOR TO HIMSELF AND CORNELIUS BLAKESLEE, OF SAME PLACE.

IMPROVEMENT IN AUTOMATIC TOYS.

Specification forming part of Letters Patent No. 149,481, dated April 7, 1874; application filed February 18, 1874.

*To all whom it may concern:*

Be it known that I, EDWARD R. IVES, of Bridgeport, in the county of Fairfield and State of Connecticut, have invented a new Improvement in Mechanical Toy; and I do hereby declare the following, when taken in connection with the accompanying drawing, and the letters of reference marked thereon, to be a full, clear, and exact description of the same, and which said drawing constitutes part of this specification, and represents a side view.

This invention relates to an improvement in what are termed mechanical toys—that is to say, the class of toys which are made to be operated by a clock-work embodied in the structure, and particularly toy carriages having a horse or horses attached thereto.

A galloping movement has heretofore been given to the horse by employing an extra wheel, and connecting from a crank on the wheel-shaft to the feet of the horse. This extra wheel and connection give an unnatural and unsatisfactory appearance to the horse.

The object of this invention is to overcome this feature; and it consists, first, in suspending the horse directly from the carriage, and upon pivots, substantially at the center of the body, and connecting the horse directly with clock-work, so that a rocking or galloping movement is imparted from the clock-work by direct connection with the horse; second, in connecting one arm of the driver directly to the clock-movement, so that a whip or other device placed in his hand will be moved, giving it the appearance of whipping the horse.

A is the body of the wagon, supported upon a suitable axle or axles, B, and wheels C, and provided with the usual means of directing the path of the carriage, and, also, with the usual clock mechanism to drive the carriage. The shafts D are rigidly attached to some part of the carriage, and project out, and between the shafts the horse E is hung upon pivots *a*, so that the horse will swing free on those pivots, its feet slightly raised above the plane on which the carriage runs. From the pivot *a* an arm, *d*, extends down, so that by vibrating this pivot the horse is oscillated accordingly. From the lower end of the arm *d* a connecting-rod, F, extends back to connect the arm *d* with a crank, *b*, the said crank caused to revolve by the clock-work. This crank is of considerably shorter radius than the arm *d*, so that the crank *b* in revolving vibrates the arm and imparts to the horse a galloping movement—that is, causing the hind and fore feet to alternately approach the plane on which the carriage moves. Thus, the same power which propels the carriage gives to the horse directly the galloping movemen.

One arm, H, of the figure I is jointed and connected by a rod, L, to a crank, P, and the crank caused to revolve by the clock mechanism, so as to impart to the arm an up-and-down vibration. A whip, R, is placed in that hand of the figure, and the vibration of the arm gives to the figure the appearance of whipping the horse or swinging the thing placed in the hand.

I do not wish to be understood as broadly claiming imparting to parts of the horse an automatic movement from the clock-work, as such may be found in the patent of J. B. Cuzner, No. 112,325, dated March 7, 1871.

I claim as my invention—

1. In combination with a carriage having a clock-work arranged for its propulsion, and a pole or shafts rigidly attached to the carriage, a horse or horses pivoted to and supported by said pole or shafts, and connected with clock mechanism, so that the same power which drives the carriage will impart directly to the horse a rocking or galloping movement, the said pivot forming the center of motion of the horse, substantially as specified.

2. In combination with a toy carriage and a figure supported thereon, a connection directly between the clock-work which drives the carriage and one arm of said figure, to impart a vibrating or swinging movement to the said arm.

EDWARD R. IVES.

Witnesses:
 JOEL BLAKESLEE,
 JNO. J. MOTT.